United States Patent [19]

Usami et al.

[11] 4,229,549

[45] Oct. 21, 1980

[54] THERMOPLASTIC RESIN COMPOSITION COMPRISING A RIGID THERMOPLASTIC RESIN AND A GRAFT COPOLYMER

[75] Inventors: Seiji Usami; Masanori Oota, both of Iwaki; Hitoshi Takita, Tokyo; Hideyuki Hashizume, Iwaki, all of Japan

[73] Assignee: Kureha Kagaku Kogyo Kabushiki Kaisha, Tokyo, Japan

[21] Appl. No.: 889,116

[22] Filed: Mar. 22, 1978

[30] Foreign Application Priority Data

Apr. 8, 1977 [JP] Japan ................................ 52-40074
Apr. 15, 1977 [JP] Japan ................................ 52-43202

[51] Int. Cl.$^2$ ............................................. C08L 51/00
[52] U.S. Cl. ...................................... 525/76; 525/67; 525/74; 525/77; 525/78; 525/79; 525/82; 525/83; 525/85; 525/308; 526/328.5; 526/329.1; 526/329.3; 526/329.4; 526/329.6
[58] Field of Search ................ 260/876 R; 526/336; 525/67, 74, 76, 77, 78, 79, 82, 83, 85, 308

[56] References Cited

U.S. PATENT DOCUMENTS

| | | | |
|---|---|---|---|
| 3,285,889 | 11/1966 | Arnold | 526/336 |
| 3,636,181 | 1/1972 | Jones et al. | 526/336 |
| 3,689,598 | 5/1972 | Bierwirth et al. | 260/876 R |
| 3,821,329 | 6/1974 | Gallagher | 260/876 R |
| 3,983,186 | 9/1976 | Eilers et al. | 260/876 R |

*Primary Examiner*—Harry Wong, Jr.
*Attorney, Agent, or Firm*—Oblon, Fisher, Spivak, McClelland & Maier

[57] ABSTRACT

An alkyl acrylate copolymer comprises 60 to 99.5 wt. % of a $C_2$–$C_{12}$ alkyl acrylate component, 0.1 to 10 wt. % of a polyfunctional monomer component having one or more conjugated double bond and one or more non-conjugated double bond and 0 to 35 wt. % of a comonomer component. A thermoplastic resin composition comprises 97 to 70 wt. parts of a rigid thermoplastic resin and 3 to 30 wt. parts of the alkyl acrylate copolymer.

8 Claims, No Drawings

4,229,549

THERMOPLASTIC RESIN COMPOSITION COMPRISING A RIGID THERMOPLASTIC RESIN AND A GRAFT COPOLYMER

BACKGROUND OF THE INVENTION

1. Field of the Invention

The present invention relates to an alkyl acrylate copolymer. More particularly, it relates to a copolymer comprising a main component of an alkyl acrylate and a polyfunctional monomer component having conjugated double bond and non-conjugated double bond and optionally a comonomer component or a copolymer obtained by graft-copolymerizing monomers on the copolymer.

2. Description of the Prior Arts

As well-known, the resins obtained by graft-copolymerizing styrene, methyl methacrylate or acrylonitrile on a polybutadiene rubber (hereinafter referring to as ABS resin) are copolymers having excellent impact strength and fabricability. However, ABS resins are disadvantageously deteriorated by ultraviolet rays because of double bonds of the butadiene component.

The resins obtained by graft-copolymerizing styrene, methyl methacrylate or acrylonitrile on a crosslinked polyacrylate elastomer (hereinafter referring to as AAS resin) have been proposed as the resin having improved weathering durability without deteriorating excellent impact strength of ABS resins. The AAS resins have the improved weathering durability however, they have not satisfactory impact strength and fabricability.

The rigid thermoplastic resins such as vinyl chloride resins, chlorinated vinyl chloride resins, methacrylate resins, styrene-acrylonitrile copolymers, α-methylstyrene-styreneacrylonitrile copolymer and polycarbonates are brittle by impact whereby ABS resin or AAS resin has been blended to the rigid thermoplastic resin. However, when ABS resin is blended, the weathering durability is remarkably inferior because of the double bonds of the butadiene component which are deteriorated by ultraviolet rays. Accordingly, the compositions are not suitable for using outdoor for a long time. On the other hand, when AAS resin is blended, the impact strength and fabricability are not satisfactory.

The inventors have considered that either or both of the crosslinkage of the elastomer or the graft-copolymerization is not suitable to cause the disadvantage in the case of AAS resins, and have proposed the graft copolymers produced by using the elastomer trunk polymer produced by adding a small amount of a conjugated diolefin to an alkyl acrylate and a crosslinking agent (U.S. Pat. No. 3,959,408).

The graft copolymer imparts satisfactory impact strength and fabricability and also improved weathering durability in comparison with that of the composition blending ABS resin even though a small amount of the conjugated diolefin is added. However, the weathering durability is sometimes slightly inferior to that of the composition blending AAS resin. The inventors have further studied to improve it.

SUMMARY OF THE INVENTION

It is an object of the present invention to provide an alkyl acrylate copolymer which impart excellent impact strength and fabricability and also excellent weathering durability.

It is another object of the present invention to provide a thermoplastic resin composition having excellent impact strength and fabricability as well as excellent weathering durability.

The foregoing and other objects of the present invention have been attained by substituting a part or whole of the conjugated diolefin with a polyfunctional monomer having one or more conjugated double bond and one or more non-conjugated double bond.

The weathering durability may be improved because a rate of unreacted double bonds remained without reacting in the crosslinking step and graft-copolymerizing step, is relatively smaller than that of the conjugated diolefin. On the other hand, the impact strength and fabricability are excellent because the polyfunctional monomer is copolymerized with the alkyl acrylate to form the effective crosslinking structure and the graft initiating receives for easy graft-copolymerization.

DETAILED DESCRIPTION OF THE PREFERABLE EMBODIMENTS

The elastic alkyl acrylate copolymer of the present invention comprises 60 to 99.5 wt.% of an alkyl acrylate component, 0.1 to 10 wt.% of a polyfunctional monomer component having one or more conjugated double bond and one or more non-conjugated double bond and 0 to 35 wt.% of a comonomer component.

The alkyl acrylates have a $C_2$–$C_{12}$ alkyl group which can be straight chain or branched chain.

Suitable alkyl acrylates include ethyl acrylate, n-propyl acrylate, n-butyl acrylate, isobutyl acrylate, n-octyl acrylate and 2-ethylhexyl acrylate and a mixture thereof. The content of the alkyl acrylate component should be in a range of 99.5 to 60 wt.% to the monomer components for the elastic copolymer. When it is more than 99.5 wt.%, the content of the polyfunctional monomer is not enough whereby the impact strength is disadvantageously inferior. When it is less than 60 wt.%, the elastic copolymer imparting satisfactory weathering durability can not be obtained.

Suitable polyfunctional monomers having one or more conjugated double bond and one or more non-conjugated double bond include 1-methyl-2-vinyl-4,6-heptadiene-1-ol;

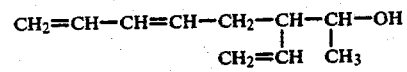

1,1-bis(1'-methyl-2'-vinyl-4',6'-heptadienoxy) alkane;

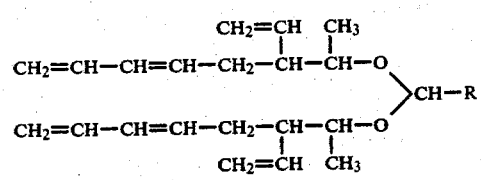

wherein R represents hydrogen atom or a $C_1$–$C_{18}$ alkyl group; 1-methyl-2-vinyl-4,6-heptadienyl-3,8-nonadienoate;

$$\underset{\underset{\text{CH}_2=\text{CH}-\text{CH}=\text{CH}-\text{CH}_2-\text{CH}-\text{CH}=\text{CH}_2}{|}}{\text{H}\overset{\overset{\text{CH}_3}{|}}{\text{C}}-\text{O}-\overset{\overset{\text{O}}{\|}}{\text{C}}-\text{CH}_2-\text{CH}=\text{CH}_2-(\text{CH}_2)_3-\text{CH}=\text{CH}_2}$$

7-methyl-3-methylene-1,6-octadiene (myrcene);

$$\text{CH}_3-\overset{\overset{\text{CH}_3}{|}}{\text{C}}=\text{CH}-\text{CH}_2-\text{CH}_2-\overset{\overset{\text{CH}_2}{\|}}{\text{C}}-\text{CH}=\text{CH}_2$$

2,6-dimethyl-1,5,7-octatriene (ocimene);

$$\text{CH}_2=\overset{\overset{\text{CH}_3}{|}}{\text{C}}-\text{CH}_2-\text{CH}_2-\text{CH}=\overset{\overset{\text{CH}_3}{|}}{\text{C}}-\text{CH}=\text{CH}_2$$

1,3,7-octatriene;

$$\text{CH}_2=\text{CH}-(\text{CH}_2)_2-\text{CH}=\text{CH}-\text{CH}=\text{CH}_2$$

1,3,6-octatriene;
$$\text{CH}_2=\text{CH}-\text{CH}=\text{CH}-\text{CH}_2-\text{CH}=\text{CH}-\text{CH}_3$$

2,6-dimethyl-1,3,7-octatriene;

$$\text{CH}_2=\overset{\overset{\text{CH}_3}{|}}{\text{C}}-\text{CH}=\text{CH}-\text{CH}_2-\overset{\overset{\text{CH}_3}{|}}{\text{CH}}-\text{CH}=\text{CH}_2$$

2,7-dimethyl-1,3,7-octatriene;

$$\text{CH}_2=\overset{\overset{\text{CH}_3}{|}}{\text{C}}-\text{CH}=\text{CH}-\text{CH}_2-\text{CH}_2-\overset{\overset{\text{CH}_3}{|}}{\text{C}}=\text{CH}_2$$

The polyfunctional monomers are not limited to the exemplified compounds.

The polyfunctional monomer can be only one or a mixture.

The content of the polyfunctional monomer is in a range of 0.1 to 10 wt.% preferable 0.2 to 8 wt.% to total monomer components for the elastic copolymer.

When it is less than 0.1 wt.%, the crosslinking and graft active site are not enough to decrease the impact strength. On the other hand, when it is more than 10 wt.%, the crosslinkage is excess to decrease the impact strength.

A comonomer component which is copolymerizable with these monomers can be incorporated at a range of 0 to 35 wt.%. When the content of the comonomer component is more than 35 wt.%, the elastic copolymer having satisfactory weathering durability can not be obtained.

Suitable comonomers include conjugated diolefins such as 1,3-butadiene, isoprene and chloroprene; aromatic vinyl compounds such as stryrene, α-methyl styrene and vinyl toluene; alkyl methacrylates such as methyl methacrylate and ethyl methacrylate; acrylic acid, methacrylic acid; acrylic acid derivatives and methacrylic acid derivatives such as glycidyl acrylate and glycidyl methacrylate; unsaturated nitrile such as acrylonitrile and methacrylonitrile; vinyl ethers such as methyl vinyl ether and butyl vinyl ether; vinyl halides such as vinyl chloride and vinyl bromide; vinylidene halides such as vinylidene chloride and vinylidene bromide; vinyl esters such as vinyl acetate (monofunctional monomers) and polyvinyl compounds such as divinyl benzene; polyhydric alcohol acrylates and methacrylates such as ethyleneglycol dimethacrylate and 1,3-butanediol diacrylate; allyl compounds such as triallyl cyanurate (polyfunctional monomers) etc.

The impact strength can be further improved by further graft-copolymerizing a monomer of an alkyl methacrylate, a vinyl aromatic compound, an unsaturated nitrile and/or a vinyl chloride on the elastic copolymer of the present invention as the graft-copolymerization.

In order to produce the elastic copolymer and the graft copolymer, the conventional emulsion-polymerization can be applied. The average diameter of the primary particles of the latex is preferably in a range of 0.05 to 3μ and the latex can be coagulated by the conventional coagulation.

The graft copolymer comprises 3 to 80 wt. parts preferably 5 to 80 wt. parts especially 50 to 80 wt. parts of the elastic trunk copolymer and 97 to 20 wt. parts preferably 95 to 20 wt. parts especially 20 to 50 wt. parts of the graft components. The content of the elastic trunk copolymer is preferably 3 to 30 wt.% especially 5 to 15 wt.% to the resin or the resin composition.

When the content of the elastic trunk copolymer is less than 3 wt. parts, the impact strength is inferior. On the other hand, when it is more than 80 wt. parts, a caking is caused in the acid precipitation or drying step whereby the graft copolymer can not be uniformly blended to the other resin and the ununiform mechanical properties are caused.

The graft copolymer can be obtained by graft-copolymerizing the monomer comprising 70 to 100 wt.% of at least one monomer selected from the group consisting of alkyl methacrylates, vinyl aromatic compounds, unsaturated nitriles and vinyl chloride and 30 to 0 wt.% of a comonomer for the branch polymer, in an aqueous medium dispersing the elastic trunk copolymer by an emulsification.

The alkyl methacrylates can have a straight or branched alkyl group having 1 to 4 carbon atom.

Suitable alkyl methacrylates include methyl methacrylate, ethyl methacrylate, propyl methacrylate, isopropyl methacrylate, n-butyl methacrylate, isobutyl methacrylate, t-butyl methacrylate etc. Methyl methacrylate is the typical one.

Suitable vinyl aromatic compounds include styrene, α-methyl styrene, vinyl toluene, chlorostyrene, bromostyrene etc.

Suitable unsaturated nitriles include acrylonitrile and methacrylonitrile etc.

One or more monomers in each group can be used.

Suitable comonomers include acrylic acid, acrylic acid esters, acrylamide, methacrylic acid, methacrylic acid esters (except said alkyl methacrylate having a $C_1$-$C_4$ alkyl group), methacrylamide, alkyl vinyl ethers, alkyl vinyl esters, molecular weight regulators, polyfunctional monomers etc.

When the graft copolymer is blended to the rigid thermoplastic resin, it is preferable to incorporate a polyfunctional monomer as the branch polymer for the graft copolymer. The polyfunctional monomers can be any polyfunctional monomer, suitable polyfunctional monomers include polyhydric alcohol di-or tri-methacrylates, polyvinyl compounds such as divinyl benzene, allyl compounds etc. One or more polyfunctional monomer can be incorporated.

The miscibility with the rigid thermoplastic resin is improved and the dispersibility of the reinforcing material can be improved and the impact strength can be increased by crosslinking the branch polymer by incorporating suitable amount of the polyfunctional monomer.

The stress whitening of the composition caused by bending can be reduced and the melt-flow viscosity can be controlled by incorporating the polyfunctional monomer.

However, when the content of the polyfunctional monomer component in the branch polymer is more than 5 wt.% or less than 0.1 wt.%, these effects can not be expected. The content of the polyfunctional monomer component is preferably in a range of 0.2 to 3 wt.%.

In the graft-copolymerization whole of the monomers can be charged at once or a part or whole of the monomers can be continuously charged or intermittently charged to perform the graft-copolymerization.

The graft-copolymerization can be carried out in one step process by uniformly mixing all of the monomers or in two or more step process by varying the contents of the monomers so as to vary the components.

When the graft copolymer is blended to the rigid thermoplastic resin, the optimum form of the graft copolymer can be obtained by the two step graft-copolymerization.

The graft copolymer is produced by (a) graft-copolymerizing 5 to 45 wt. parts of a monomer mixture comprising 10 to 80 wt.% of styrene, 5 to 40 wt.% of methyl methacrylate, 5 to 50 wt.% of acrylonitrile 0 to 30 wt.% of a comonomer having one vinyl or vinylidene group and 0.1 to 3 wt.% preferably 0.5 to 3 wt.% of the polyfunctional monomer on 50 to 80 wt. parts of the crosslinked trunk polymer as the first step and (b) graft-copolymerizing 5 to 45 wt. parts of a monomer mixture comprising 100 to 70 wt.% of methyl methacrylate containing 0.1 to 3 wt.% preferably 0.5 to 3 wt.% of a polyfunctional monomer and 0 to 30 wt.% of a comonomer having one vinyl or vinylidene group on the graft copolymer as the second step to use 20 to 50 wt. parts of total graft monomers.

When a $C_1$-$C_4$ alkyl methacrylate component is incorporated as the main component in the second step, the miscibility of the graft copolymer and the rigid thermoplastic resin can be improved.

When the content of the unsaturated nitrile component is in a range of 5 to 50 wt.%, the impact strength improving effect can be superior. When it is more than 50 wt.%, the thermal stability is inferior. When it is less than 5 wt.%, the impact strength improving effect is disadvantageously low.

The resulting graft copolymer is fabricated with or without blending to the rigid thermoplastic resin.

The rigid thermoplastic resins include vinyl chloride resins, post-chlorinated vinyl chloride resin, methacryl resins, styreneacrylonitrile copolymers, α-methylstyrene-styrene-acrylonitrile copolymers, polycarbonate resins etc.

The graft copolymers of the present invention especially impart excellent characteristics to the compositions prepared by blending it to the vinyl chloride resin.

When the graft copolymer is blended to the rigid thermoplastic resin, it is preferable to provide the composition comprising 97 to 70 wt. parts of the rigid thermoplastic resin and 3 to 30 wt. parts of the graft copolymer of the present invention.

When the content of the graft copolymer is less than 3 wt. parts, the impact strength is inferior. When the content of the graft copolymer is more than 30 wt. parts, the rigidity of the composition is inferior disadvantageously.

Suitable coloring agents such as dyes, pigments; light or thermal stabilizers, inorganic or organic granular, powdery or fibrous fillers, blowing agent, flame retardants and processing agents can be incorporated in the graft copolymer of the present invention or the resin composition thereof.

The graft copolymer or the copolymer thereof can be fabricated by various conventional molding methods such as injection molding method and extrusion molding method etc. and it can be effectively utilized as a structural element of a multi-layer molded product especially as the outer layer thereof. The following examples will further illustrate the embodiment of the present invention. In these examples, all parts and percents given are by weight unless otherwise noted.

EXAMPLE 1

A. Preparation of Elastic Component

In an autoclave, the components shown in Table 1 were charged under feeding nitrogen gas, and a polymerization was carried out at 45° C. for 16 hours with stirring.

TABLE 1

| | |
|---|---|
| Distilled water: | 250 wt. parts |
| Ferrous sulfate ($FeSO_4 \cdot 7H_2O$): | 0.003 wt. part |
| Disodium ethylenediamine tetraacetate: | 0.004 wt. part |
| Formaldehyde sodium sulfoxylate: | 0.06 wt. part |
| Potassium oleate: | 0.6 wt. part |
| Sodium pyrophosphate: | 0.15 wt. part |
| Butyl n-acrylate: | 100 wt. parts |
| 1-Methyl-2-vinyl-4,6-heptadiene-1-ol: | 1 wt. part |
| Diisopropyl benzene hydroperoxide: | 0.3 wt. part |

After 4 hours from the initiation of the polymerization 0.6 wt. part of potassium oleate was further added. The yield was higher than 98%.

B. Preparation of Graft copolymer

The latex containing 20 wt. part of the elastic component as the solid content obtained by the step A was substantially stabilized by adding 0.1 wt. part of dioctyl sodium sulfosuccinate and then, 15 wt. parts of 0.2% aqueous solution of hydrochloric acid was gradually added to the latex so as to coagulate the elastic component.

The average diameter of the elastic component before the coagulation was $0.08\mu$ while the average diameter of the coagulated elastic component was $0.17\mu$. An aqueous solution of sodium hydroxide was added so as to adjust pH of the latex to 10.0. The components shown in Table 2 were added and the polymerization was carried out at 60° C. for 10 hours.

During the operation, each of 0.4 wt. part of potassium oleate was added at 2 hours or 4 hours from the initiation of the polymerization. The yield was more than 98%.

TABLE 2

| | |
|---|---|
| Distilled water: | 200 wt. parts |
| Ferrous sulfate (FeSO$_4$ . 7H$_2$O): | 0.0025 wt. part |
| Disodium ethylenediamine tetraacetate: | 0.003 wt. part |
| Formaldehyde sodium sulfoxylate: | 0.05 wt. part |
| Sodium pyrophosphate: | 0.1 wt. part |
| Styrene: | 43 wt. parts |
| Acrylonitrile: | 21 wt. parts |
| Methyl methacrylate: | 16 wt. parts |
| Diisopropyl benzene hydroperoxide: | 0.25 wt. part |
| Tert-dodecyl mercaptan: | 0.4 wt. part |

The resulting latex was admixed with 0.5 wt. part of 2,6-di-t-butyl para-cresol and 0.5 wt. part of dilauryl thiodipropionate and the product was precipitated with an acid and dehydrated and dried to obtain the graft copolymer powder.

The graft copolyer was kneaded on a roll mill at 160° C. for 3 minutes.

The graft copolymer was maintained under suitable condition without a separation to show excellent fabricatability. The graft copolymer was molded at the pressing temperature of 200° C. under the pressing pressure of 150 Kg/cm$^2$ to form a sheet having a thickness of 3 mm and the physical properties were measured.

The Izod strength of the pressed sheet measured by Japanese Industrial Standard K-7110 was 20.3 Kg.cm/cm$^2$ which was superior to that of the pressed sheet of ABS resin molded by the same manner which was 19.5 Kg.cm/cm$^2$.

An accelerated exposing test was carried out for the pressed sheet by a weather meter (Toyo Rika WE-SUN-HC type). After exposing 300 hours, the Izod strengths of the pressed sheets of the graft copolymer and the ABS resin were respectively 15.3 Kg.cm/cm$^2$ and 9.8 Kg.cm/cm$^2$. The fact shows that the weathering durability of the graft copolymer was remarkably superior to that of the ABS resin.

EXAMPLE 2 AND REFERENCES

In accordance with the process of Example 1, except varying the content of the polyfunctional monomer of 1-methyl-2-vinyl-4,6-heptadiene-1-ol or replacing 1-methyl-2-vinyl-4,6-heptadiene-1-ol to various polyfunctional monomers in the preparation of the elastic component or replacing the polyfunctional monomer to butadiene and 1,3-butanediol diacrylate as shown in Table 3, the graft copolymers were prepared. The results are shown in Table 3.

TABLE 3

| | Composition of elastic component part | | | Physical property of graft copolymer Izod strength (Kg . cm/cm$^2$) Accelerated exposing test (hour) | |
|---|---|---|---|---|---|
| | BA | But | Polyfunctional monomer | 0 | 300 |
| Example 2-1 | 100 | — | 2.0 (4,6-HD) | 19.7 | 16.2 |
| 2-2* | 100 | — | 2.0 (4,6-HD) | 17.4 | 14.2 |
| 2-3 | 100 | — | 4.0 (4,6-HD) | 18.5 | 15.0 |
| 2-4 | 100 | — | 8.0 (4,6-HD) | 19.2 | 15.4 |
| 2-5 | 100 | — | 2.0 (4',6'-HDE) | 19.5 | 16.1 |
| 2-6 | 100 | — | 2.0 (1,6-OD) | 20.3 | 16.9 |
| 2-7 | 100 | — | 2.0 (1,3,7-OT) | 20.4 | 16.2 |
| Reference 2-8 | 100 | But 7 | 1.0 (1,3-BD) | 20.2 | 12.2 |
| 2-9 | 100 | — | 2.0 (DVB) | 13.2 | 7.4 |
| 2-10 | 100 | — | 2.0 (EDMA) | 12.7 | 6.5 |

Note:
BA: n-butyl acrylate
But: butadiene
4,6-HD: 1-methyl-2-vinyl-4,6-heptadiene-1-ol
4',6'-HDE: 1,1-bis(1'-methyl-2'-vinyl-4',6'-heptadienoxy)ethane
1,6-OD: 7-methyl-3-methylene-1,6-octadiene
1,3,7-OT: 1,3,7-octatriene
DVB: divinyl benzene
EDMA: ethyleneglycol dimethacrylate
1,3 BD: 1,3-butanediol diacrylate
*Example 2-2: The coagulation was not carried out.

EXAMPLE 3

(A) Preparation of crosslinked elastic polymer

The components shown in Table 4 were charged into an autoclave in nitrogen gas atmosphere and stirred at 45° C. and the components shown in Table 5 were added during 4 hours to perform the copolymerization.

TABLE 4

| | |
|---|---|
| Distilled water: | 175 wt. parts |
| Ferrous sulfate: | 0.002 wt. part |
| Disodium ethylenediamine tetraacetate: | 0.003 wt. part |
| Formaldehyde sodium sulfoxylate: | 0.049 wt. part |
| Potassium oleate: | 0.4 wt. part |
| Sodium pyrophosphate | 0.1 wt. part |

TABLE 5

| | |
|---|---|
| n-Butyl acrylate: | 65 wt. parts |
| 1-Methyl-2-vinyl-4,6-heptadiene-1-ol: | 0.65 wt. part |
| Diisopropyl benzene hydroperoxide: | 0.195 wt. part |

After the addition of the components of Table 5, 0.5 wt. part of potassium oleate was added and the polymerization was continued at 45° C. for 5 hours. The yield of the elastic polymer was more than 97%.

A part of the latex was precipitated by adding hydrochloric acid and the polymer was washed with water and with methanol and dried under a reduced pressure. The resulting polymer had a reduced viscosity of 0.059$\eta$sp/c at 30° C. in benzene at 4 g/liter.

(B) Preparation of graft copolymer

The latex containing 65 wt. parts of a crosslinked elastic polymer as the solid component, was stabilized by adding 0.0325 wt. part of dioctyl sodium sulfosuccinate and then, 50 wt. parts of 0.2% aqueous solution of hydrochloric acid was gradually added to it to coagulate it. The average diameter of the particles of the latex before the coagulation was 0.07$\mu$ whereas that of the latex after the coagulation was 0.18$\mu$.

An aqueous solution of sodium hydroxide was added to the latex to adjust pH to 10.0. The first graft components shown in Table 6 were added to the latex and the graft-copolymerization was carried out at 60° C. for 4 hours. The conversion was more than 98%.

TABLE 6

| | |
|---|---|
| Styrene: | 11 wt. parts |
| Methyl methacrylate: | 5 wt. parts |
| Acrylonitrile: | 4 wt. parts |
| Ethyleneglycol dimethacrylate: | 0.152 wt. part |
| Diisopropyl benzene hydroperoxide: | 0.02 wt. part |
| Formaldehyde sodium sulfoxylate | 0.01 wt. part |

The second graft components shown in Table 7 were added to the resulting latex and the graft-copolymerization was carried out at 60° C. for 7 hours.

TABLE 7

| | |
|---|---|
| Methyl methacrylate: | 15 wt. parts |
| Ethyleneglycol dimethacrylate: | 0.114 wt. part |
| Diisopropyl benzene hydroperoxide: | 0.015 wt. part |
| Formaldehyde sodium sulfoxylate: | 0.005 wt. part |

The resulting latex contained about 30% of the solid content to show the fact of substantial completion of the polymerization.

The latex was admixed with antioxidants of 0.5 wt. part of 2,6-di-tert-butyl paracresol and 0.5 wt. part of dilauryl thiodipropionate and the latex was precipitated with an acid and dehydrated and dried to obtain the graft copolymer powder.

(C) Preparation of vinyl chloride resin composition

10 Parts of the graft copolymer was blended to 90 wt. parts of vinyl chloride resin (average polymerization degree; 1,000) and 3.8 wt. parts of tin type stabilizer (1.0 wt. parts of polymerized organo-tin mercapto compound, 1.0 wt. part of polymerized organo-tin maleate, 1.5 wt. parts of calcium stearate and 0.3 wt. part of montanic acid wax) was added to the mixture. The mixture was kneaded on a roll mill at the surface temperature of 170° C. for 3 minutes to obtain the vinyl chloride composition.

The composition was maintained under suitable condition without a separation to show excellent fabricability.

The composition was molded at the pressing temperature of 200° C. under the pressing pressure of 150 Kg/cm$^2$ to form a sheet having a thickness of 3 mm and the physical properties were measured.

The Charpy impact strength of the pressed sheet measured by Japanese Industrial Standard K-7110 was 147 Kg.cm/cm$^2$ which was superior to that of the pressed sheet of a composition prepared by blending MBS resin to vinyl chloride resin which was 14.5 Kg.cm/cm$^2$ and which was remarkably superior to the Charpy impact strength of vinyl chloride resin which was 5 Kg.cm/cm$^2$.

An accelerated exposing test was carried out for the pressed sheet by a weather meter (Toyo Rika WE-SUN-HC type). After exposing 300 hours, the Charpy impact strengths of the pressed sheets of the composition containing the graft copolymer and the composition containing MBS resin were respectively 125 Kg.cm/cm$^2$ and 14 Kg.cm/cm$^2$. The fact shows that the weathering durability of the composition containing the graft copolymer was remarkably superior to that of the composition containing MBS resin.

When the pressed sheet having a thickness of 0.5 mm was bended and the stress whitening was observed. The composition of the invention had not substantially stress whitening.

EXAMPLE 4 AND REFERENCES

In accordance with the process of Example 3 except varying the content of the polyfunctional monomer of 1-methyl-2-vinyl-4,6-heptadiene-1-ol or replacing 1-methyl-2-vinyl-4,6-heptadiene-1-ol to various polyfunctional monomers in the preparation of the crosslinked elastic polymer or replacing the polyfunctional monomer to butadiene and 1,3-butanediol diacrylate as shown in Table 8, the compositions were prepared.

The results are shown in Table 8. The fact that the vinyl chloride resin composition containing the graft copolymer of the invention had satisfactory weathering durability, impact strength and fabricatability was found.

TABLE 5

| | | | | | Components of graft copolymer (part) | | | | | | Physical property of vinyl chloride resin composition** | | | |
|---|---|---|---|---|---|---|---|---|---|---|---|---|---|---|
| | | | | Polyfunctional | First graft components | | | | Second graft components | | Charpy impact strength (kg.cm/cm$^2$) Accelerated exposing test (hrs) | | Stress | Fabricatability |
| | | BA | But | monomer | ST | MMA | AN | EDMA | MMA | EDMA | 0 | 300 | whitening | ability |
| Exp. | 4-1 | 65 | — | 1.30 (4,6-HD) | 11 | 5 | 4 | 0.152 | 15 | 0.114 | 147 | 128 | | |
| | 4-2* | 65 | — | 1.30 (4,6-HD) | 11 | 5 | 4 | 0.152 | 15 | 0.114 | 149 | 129 | | |
| | 4-3 | 65 | — | 2.60 (4,6-HD) | 11 | 5 | 4 | 0.152 | 15 | 0.114 | 142 | 126 | Substantial | No separation |
| | 4-4 | 65 | — | 5.20 (4,6-HD) | 11 | 5 | 4 | 0.152 | 15 | 0.114 | 132 | 118 | no stress | in kneading |
| | 4-5 | 65 | — | 1.30 (4',6'-HDE) | 11 | 5 | 4 | 0.152 | 15 | 0.114 | 143 | 120 | whitening | on roll mill |
| | 4-6 | 65 | — | 1.30 (1,6-OD) | 11 | 5 | 4 | 0.152 | 15 | 0.114 | 148 | 121 | | |
| | 4-7 | 65 | — | 1.30 (1,3,7-OT) | 11 | 5 | 4 | 0.152 | 15 | 0.114 | 146 | 124 | | |
| Ref. | 4-8 | 61.3 | But 4.35 | 0.65(1,3BD) | 11 | 5 | 4 | 0.152 | 15 | 0.114 | 146 | 107 | Severe stress | Separation on roll mill |
| | 4-9 | 65 | — | 1.30 (DVB) | 11 | 5 | 4 | 0.152 | 15 | 0.114 | 40 | — | | |

TABLE 5-continued

| | | | Components of graft copolymer (part) | | | | | | Physical property of vinyl chloride resin composition** | | | |
| | | | | First graft components | | | | Second graft components | | Charpy impact strength (kg · cm/cm$^2$) Accelerated exposing test (hrs) | | Stress | Fabricat- |
| | BA | But | Polyfunctional monomer | ST | MMA | AN | EDMA | MMA | EDMA | 0 | 300 | whitening | ability |
|---|---|---|---|---|---|---|---|---|---|---|---|---|---|
| 4-10 | 65 | — | 1.30 (EDMA) | 11 | 5 | 4 | 0.152 | 15 | 0.114 | 24 | — | whitening | |

Note*
BA: n-butyl acrylate
MMA: methyl methacrylate
4,6-HD: 1-methyl-2-vinyl-4,6-heptadiene-1-ol
4',6'-HDE: 1,1-bis(1'-methyl-2'-vinyl-4',6'-heptadienoxy)ethane
1,6-OD: 7-methyl-3-methylene-1,6-octadiene
1,3,7-OT: 1,3,7-octatriene
DVB: divinyl benzene
EDMA: ethyleneglycol dimethacrylate
1,3BD: 1,3-butanediol diacrylate
AN: acrylonitrile
But: butadiene
ST: styrene
*Example 4-2 The coagulation was not carried out before polymerize grafted monomers
**The preparation of the graft copolymer and measurement of properties of the composition are the same with those of Example 1.

What is claimed is:

1. A thermoplastic resin composition, which comprises:
97 to 70 parts per weight of a rigid thermoplastic resin and 3 to 30 parts by weight of a graft copolymer which is produced by graft-polymerizing onto 50 to 80 parts by weight of an elastic trunk polymer, by a one step or multistep process, from 50 to 20 parts by weight of a monomer mixture comprising 10 to 95 wt.% of a $C_1$–$C_4$ alkyl methacrylate, 0 to 80 wt.% of a vinyl aromatic monomer, 0 to 50 wt.% of an unsaturated nitrile, 0 to 30 wt.% of a monomer selected from the group consisting of acrylic acid, acrylic acid esters, acrylamide, methacrylic acid, methacrylic acid esters excluding $C_1$–$C_4$ alkyl methacrylates, methacrylamide, alkylvinyl ethers, and alkylvinyl esters and 0 to 5 wt.% of a polyfunctional monomer containing at least two olefinic groups, said elastic trunk polymer comprising 60 to 99.5 wt.% of a $C_2$–$C_{12}$ alkylacrylate component, 0.1 to 10 wt.% of a polyfunctional monomer component being an alcohol, ester, ether or hydrocarbon compound having at least one conjugated double bond and at least one non-conjugated double bond and 0 to 35 wt.% of a comonomer component selected from the group consisting of 1, 3-butadiene, isoprene, chloroprene, an aromatic vinyl compound, an alkylmethacrylate, acrylic acid, methacrylic acid, glycidyl esters of acrylic acid and methacrylic acid, an unsaturated nitrile, a vinyl ether, a vinyl halide, a vinylidene halide, a vinyl ester, a polyvinyl compound, a polyhydric alcohol acrylate, a polyhydric alcohol methacrylate and an allyl compound.

2. The composition of claim 1, wherein said $C_2$–$C_{12}$ alkylacrylate is ethylacrylate, n-propylacrylate, n-butylacrylate, isobutylacrylate, n-octylacrylate or 2-ethylhexylacrylate.

3. The composition of claim 1, wherein said polyfunctional monomer component of said elastic trunk polymer ranges from 0.2 to 8 wt.% of the total monomer content of the trunk polymer.

4. The composition of claim 1, wherein the graft copolymer is prepared by first (a) graft-copolymerizing onto 50 to 80 parts by weight of said trunk polymer, 5 to 45 parts by weight of a monomer mixture comprising 10 to 80 wt.% styrene, 5 to 40 wt.% methylmethacrylate, 5 to 40 wt.% acrylonitrile, 0 to 30 wt.% of a comonomer selected from the group consisting of acrylic acid, acrylic acid esters, acrylamide, methacrylic acid, methacrylic acid esters excluding $C_1$–$C_4$ alkylmethacrylates, methacrylamide, alkylvinyl ethers, and alkylvinyl esters and 0.1 to 3 wt.% of a polyfunctional monomer containing at least two olefinic groups; and secondly (b) graft-copolymerizing onto said grafted trunk polymer, from 5 to 45 parts by weight of a monomer mixture comprising 100 to 70 wt.% of methylmethacrylate containing 0.1 to 3 wt.% of a polyfunctional monomer containing at least two olefinic groups and 0 to 30 wt.% of a comonomer selected from the group consisting of acrylic acid, acrylic acid esters, acrylamide, methacrylic acid, methacrylic acid esters excluding $C_1$–$C_4$ alkylmethacrylates, methacrylamide, alkylvinyl ethers, and alkylvinyl esters the total monomer content in both graft-polymerization steps ranging from 50 to 20 parts by weight of the graft-copolymer.

5. The composition of claim 4, wherein said elastic trunk polymer contains from 0.2 to 8 wt.% of said polyfunctional monomer component.

6. A composition of claim 1, wherein said rigid thermoplastic resin is a vinylchloride resin.

7. The composition of claim 1, wherein said $C_1$–$C_4$ alkylmethacrylate is methylmethacrylate.

8. A thermoplastic resin composition, which comprises:
97 to 70 parts per weight of a rigid thermoplastic resin and 3 to 30 parts by weight of a graft copolymer which is produced by graft-polymerizing onto 50 to 80 parts by weight of an elastic trunk polymer, by a one-step or multistep process, from 50 to 20 parts by weight of a monomer mixture comprising 10 to 95 wt.% of a $C_1$–$C_4$ alkyl methacrylate, 0 to 80 wt.% of a vinyl aromatic monomer, 0 to 50 wt.% of an unsaturated nitrile, 0 to 30 wt.% of a monomer selected from the group consisting of acrylic acid, acrylic acid esters, acrylamide, methacrylic acid, methacrylic acid esters excluding $C_1$-$C_4$ alkyl methacrylates, methacrylamide, alkylvinyl ethers and alkylvinyl esters, and 0 to 5 wt.% of a polyfunctional monomer containing at least two olefinic groups, said elastic trunk polymer comprising 60 to 99.5 wt.% of a $C_2$-$C_{12}$ alkylacrylate component, 0.1 to 10 wt.% of a polyfunctional monomer selected from the group consisting of a 1-methyl-2-vinyl-4, 6-heptadiene-1-ol; 1, 1-bis(1'-methyl-2'-vinyl-4', 6'-heptadienoxy) alkane ($C_1$-$C_{19}$); 1-methyl-2-vinyl-4,6-heptadienyl-3, 8-nonadienoate; 7-methyl-3-methylene-1, 6-octadiene; 2, 6-dimethyl-1,5,7-octatriene; 1,3, 7-octatriene; 1,3, 6-octatriene; 2, 6-dimethyl-1, 3, 7-octatriene and 2, 7-dimethyl-1, 3,7-octatriene and 0 to 35 wt.% of a comonomer component selected from the group consisting of 1, 3-butadiene, isoprene, chloroprene, an aromatic vinyl compound, an alkylmethacrylate, acrylic acid, methacrylic acid, glycydyl esters of acrylic acid and methacrylic acid, an unsaturated nitrile, a vinyl ether, a vinyl halide, a vinylidene halide, a vinyl ester, a polyvinyl compound, a polyhydric alcohol acrylate, a polyhydric alcohol methacrylate and an allyl compound.

* * * * *